United States Patent
Ranganathan et al.

(10) Patent No.: US 12,507,936 B1
(45) Date of Patent: Dec. 30, 2025

(54) APPARATUS AND METHOD FOR GENERATING OUTPUT DATA AS A FUNCTION OF DIGITAL IMAGE DATA AND AN ANALYSIS MODULE

(71) Applicant: Anumana, Inc., Cambridge, MA (US)

(72) Inventors: Mohan Krishna Ranganathan, Bengaluru (IN); Wui Ip, San Francisco, CA (US); Animesh Agarwal, San Mateo, CA (US); Shashi Kant, Bengaluru (IN); Rakesh Barve, Bengaluru (IN); Shiv Pratap Singh, Bengaluru (IN)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 19/085,334

(22) Filed: Mar. 20, 2025

(51) Int. Cl.
   *A61B 5/339* (2021.01)
   *A61B 5/00* (2006.01)
   *A61B 5/346* (2021.01)
   *G06F 3/16* (2006.01)
   (Continued)

(52) U.S. Cl.
   CPC .............. *A61B 5/339* (2021.01); *A61B 5/346* (2021.01); *A61B 5/7267* (2013.01); *A61B 5/746* (2013.01); *A61B 5/7475* (2013.01); *G06F 3/167* (2013.01); *G06T 7/0016* (2013.01); *G16H 10/60* (2018.01); *G06T 2200/24* (2013.01); *G06T 2207/20081* (2013.01); *G06T 2207/20084* (2013.01); *G06T 2207/30048* (2013.01)

(58) Field of Classification Search
   None
   See application file for complete search history.

(56) References Cited

U.S. PATENT DOCUMENTS

| | | | |
|---|---|---|---|
| 8,060,795 | B2 | 11/2011 | Bakekolo et al. |
| 9,459,945 | B2 | 10/2016 | Habets et al. |
| 10,430,458 | B2 | 10/2019 | Lahmann et al. |

(Continued)

FOREIGN PATENT DOCUMENTS

CN 103175570 A 6/2013

OTHER PUBLICATIONS

Gliner,V.,Keidar,N.,Makarov,V.et al.Automaticclassificationofhealth yanddiseaseconditionsfromimagesordigitalstandard 12-leadelectrocardiograms.SciRep10,16331(2020).https://doi.org/10.1038/s41598-020-73060-w (Year: 2020).*

*Primary Examiner* — Nancy Bitar
(74) *Attorney, Agent, or Firm* — Caldwell Intellectual Property Law

(57) ABSTRACT

An apparatus and method for generating output data as a function of digital image data and an analysis module. The apparatus includes at least a processor and a memory communicatively connected to the at least a processor. The memory instructs the processor to present a graphical user interface comprising medical time-series data, receive a capture event as a function of a first user command, generate, as a function of the capture event, digital image data, wherein the digital image data comprises a window of the graphical user interface, verify, using user confirmation, the window of the graphical user interface, process, using one or more analysis models, the digital image data, wherein processing the digital image data comprises extracting at least a cardiac metric from the digital image data, and generate, using the analysis module, output data based on the at least a cardiac metric extracted from the digital image data.

22 Claims, 7 Drawing Sheets

(51) Int. Cl.
*G06T 7/00* (2017.01)
*G16H 10/60* (2018.01)

(56) References Cited

U.S. PATENT DOCUMENTS

| | | | |
|---|---|---|---|
| 2009/0287962 A1 | 11/2009 | Bakekolo et al. | |
| 2021/0366592 A1 | 11/2021 | Buelow et al. | |
| 2022/0031223 A1* | 2/2022 | Li | G06N 3/045 |
| 2022/0301287 A1* | 9/2022 | Annangi | G06V 10/764 |
| 2023/0143594 A1* | 5/2023 | Yu | G16H 50/20 |
| | | | 600/523 |
| 2023/0298745 A1 | 9/2023 | Buelow et al. | |
| 2025/0064374 A1* | 2/2025 | Luo | A61B 5/339 |

\* cited by examiner

US 12,507,936 B1

APPARATUS AND METHOD FOR GENERATING OUTPUT DATA AS A FUNCTION OF DIGITAL IMAGE DATA AND AN ANALYSIS MODULE

FIELD OF THE INVENTION

The present invention generally relates to the field of image analysis. In particular, the present invention is directed to an apparatus and a method for generating output data as a function of digital image data and an analysis module.

BACKGROUND

Existing ECG systems often rely on manual data capture, causing delays in detecting cardiac events and limiting real-time insights. Many lack integration with digital image processing, preventing automated extraction and classification of cardiac metrics. Additionally, they do not dynamically update assessments from continuous data streams, reducing their ability to detect evolving conditions and provide timely alerts.

SUMMARY OF THE DISCLOSURE

In an aspect, an apparatus for generating output data as a function of digital image data and an analysis module includes at least a processor and a memory communicatively connected to the at least a processor. The memory contains instructions configuring the processor to present a graphical user interface comprising medical time-series data, receive a capture event as a function of a first user command, generate, as a function of the capture event, digital image data, wherein the digital image data comprises a window of graphical the user interface, verify, using user confirmation, the window of the graphical user interface, process, using one or more analysis models, the digital image data, wherein processing the digital image data comprises extracting at least a cardiac metric from the digital image data, and generate, using the analysis module, output data based on the at least a cardiac metric extracted from the digital image data.

In another aspect, a method for generating output data as a function of digital image data and an analysis module includes presenting, using at least a processor, a graphical user interface comprising medical time-series data, receiving using the at least a processor, a capture event as a function of a first user command, generate, as a function of the capture event, digital image data, wherein the digital image data comprises a window of the graphical user interface, verify, using user confirmation, the window of the graphical user interface, process, using one or more analysis models, the digital image data, wherein processing the digital image data comprises extracting at least a cardiac metric from the digital image data, and generate, using the analysis module, output data based on the at least a cardiac metric extracted from the digital image data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating output data as a function of digital image data and an analysis module. The apparatus includes at least a computing device comprised of a processor and a memory communicatively connected to the processor. The memory instructs the processor to present a graphical user interface comprising medical time-series data. The processor receives a capture event as a function of a first user command. The processor generates, as a function of the capture event, digital image data, wherein the digital image data comprises a window of the graphical user interface. Additionally, the processor verifies, using user confirmation, the window of the graphical user interface. The processor processes, using one or more analysis models, the digital image data, wherein processing the digital image data comprises extracting at least a cardiac metric from the digital image data. The memory then instructs the processor to generate, using the analysis module, output data based on the at least a cardiac metric extracted from the digital image data.

Figure 1:
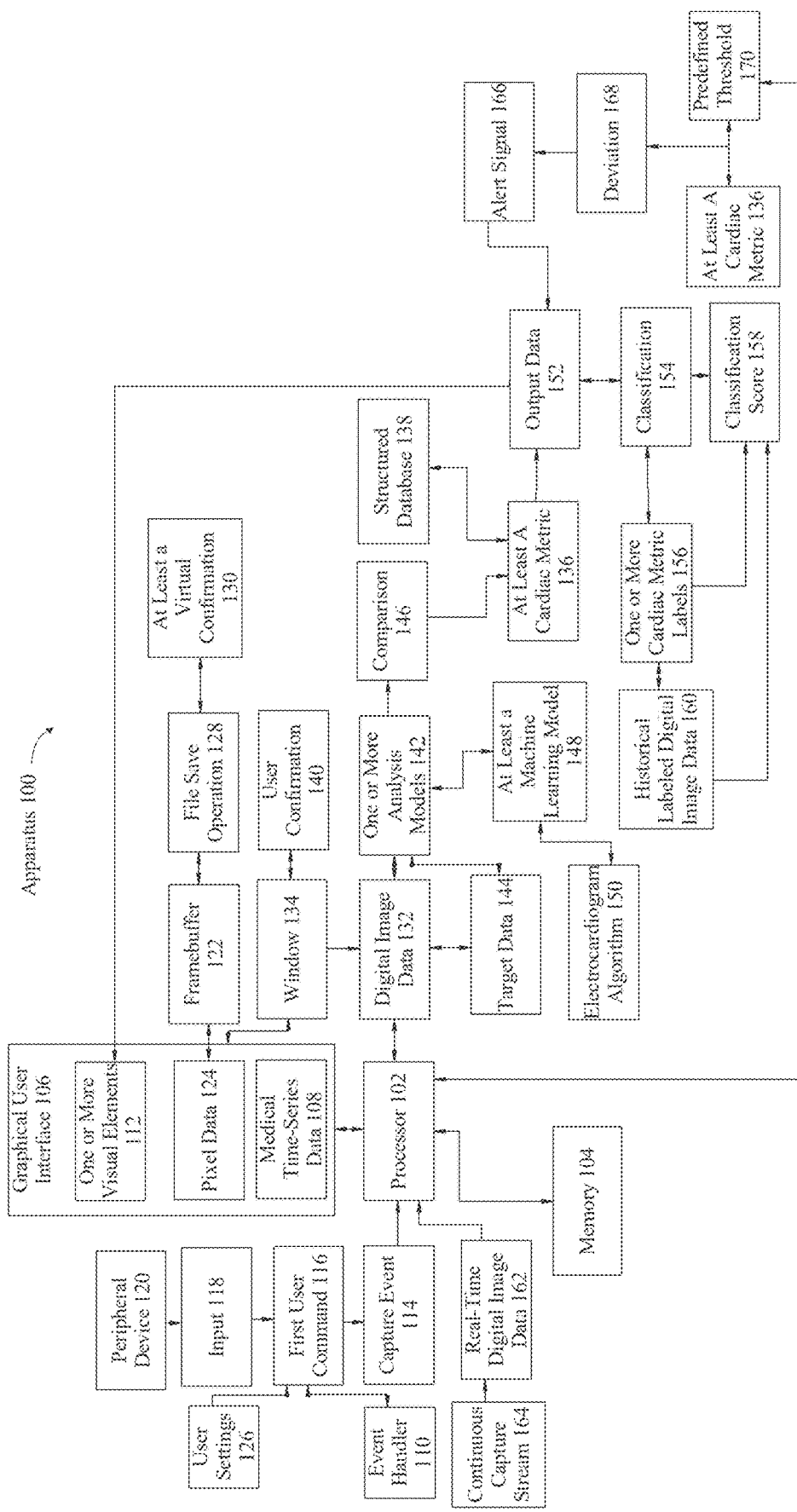
FIG. 1 is a block diagram of an apparatus for generating output data as a function of digital image data and an analysis module.

Referring now to FIG. 1, an exemplary embodiment of apparatus 100 for generating output data as a function of digital image data and an analysis module is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to present a graphical user interface 106 comprising medical time-series data 108. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 106. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface 106 and an event handler 110 may operate together to enable seamless interaction between the user and the apparatus 100. The GUI serves as the visual and interactive layer through which the user engages with the apparatus 100, presenting elements such as buttons, sliders, input fields, and informational displays. The event handler 110, on the other hand, functions as the underlying mechanism that monitors and responds to user interactions with the GUI. For example, when a user clicks a button on the GUI to request an explanation of a concept, the event handler 110 may detect the click event, identify its context, and trigger the appropriate processes within the apparatus 100 to generate a tailored response. This interplay may ensure dynamic and responsive system behavior, as the event handler 110 processes various input events such as clicks, taps, keystrokes, or voice commands, and relays these inputs to the relevant system components. The GUI subsequently updates to reflect the system's responses, such as displaying output, modifying visual elements, or providing real-time feedback. Together, the GUI and event handler 110 create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler 110 may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler 110 may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element 112 may include text, images, icons, shapes, colors, and/or other graphical components designed to be perceived by the user. In a non-limiting example, the visual element 112 may aid in communication, navigation, and/or interaction with the system. Without limitation, the visual element 112 may be used to enhance user experience, guide behavior, and/or represent data visually in an intuitive or informative way. A visual element 112 may include data transmitted to display device, client device, and/or graphical user interface 106. In some embodiments, visual element 112 may be interacted with. For example, visual element 112 may include an interface, such as a button or menu. In some embodiments, visual element 112 may be interacted with using a user device such as a smartphone, tablet, smartwatch, or computer.

With continued reference to FIG. 1, in an embodiment, apparatus 100 and or the downstream device may include a data structure. With continued reference to FIG. 1, as used in this disclosure, "data structure" is a way of organizing data represented in a specialized format on a computer configured such that the information can be effectively presented in a graphical user interface 106. In some cases, the data structure includes any input data. In some cases, the data structure contains data and/or rules used to visualize the graphical elements within a graphical user interface 106. In some cases, the data structure may include any data described in this disclosure. In some cases, the data structure may be configured to modify the graphical user interface 106, wherein data within the data structure may be represented visually by the graphical user interface 106. In some cases, the data structure may be continuously modified and/or updated by processor 102, wherein elements within graphical user interface 106 may be modified as a result. In some cases, processor 102 may be configured to transmit display device and or the downstream device the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI. The data structure may act as a bridge between the user's input, captured by the event handler 110, and the output displayed on the GUI, ensuring that information is handled efficiently and accurately throughout the interaction. For example, without limitation, when a user interacts with a dropdown menu in the GUI to select a topic, the event handler 110 may capture this input and accesses a data structure, such as a dictionary or tree, that maps each topic to its associated resources or actions. The data structure may retrieve the relevant information such as, text explanations, videos, or interactive exercises, and passes it back to the event handler 110, which may then trigger the appropriate updates to the GUI, such as displaying the selected topic's content. In another embodiment, the data structure may also maintain the state of the system, tracking user progress, preferences, and session history. For instance, without limitation, a hash table may store user specific configurations, such as preferred learning styles or recent activity, which the event handler 110 references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface 106 (GUI) that allows users to perform actions, provide input, or engage with the apparatus 100. Interactive elements may be designed to facilitate two-way communication between the user and the system, enabling the user to influence the behavior of the apparatus 100 or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data, such as a user's profile or quiz questions. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous JavaScript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, "medical time-series data" is a chronological sequence of medical-related data points collected at consistent or irregular intervals over time. Medical time-series data 108 may include vital signs, injury reports, treatment records, medication administration logs, recovery progress metrics, and/or health assessments for an individual or group. In an embodiment, medical time-series data 108 may include electrocardiogram (ECG) data. As used in this disclosure, "ECG data" is electrocardiogram-derived time-series data that represents the electrical activity of a heart over time. ECG data may include waveforms, heart rate variability, QRS complex durations, P-wave morphology, ST-segment deviations, and arrhythmia markers, which can be used to assess cardiac function, detect abnormalities, and monitor patient health trends. ECG data may be collected through wearable sensors, clinical ECG machines, or remote monitoring devices, and may be analyzed in real time or retrospectively for medical diagnostics and treatment planning. In an embodiment, the GUI may display medical time-series data 108, like real-time ECG data. Without limitation, the GUI may display heart rate variability, arrhythmia patterns, and ischemic event detection through a continuously updating time-series graph.

With continued reference to FIG. 1, medical time-series data 108 may include various types of physiological signals recorded over time to monitor patient health and diagnose conditions. For example, without limitation, medical time-series data 108 may include electrocardiograms (ECGs) which captures the electrical activity of the heart, providing critical insight into cardiac function. Similarly, medical time-series data 108 may include electrograms (EGMs) which record electrical signals directly from the heart's chambers. Other examples of medical time-series data 108 may include electroencephalograms (EEGs) for brain activity monitoring, continuous glucose monitoring (CGM) data for tracking blood sugar levels in diabetic patients, and the like.

Still referring to FIG. 1, processor 102 is configured to receive a capture event 114 as a function of a first user command 116. As used in this disclosure, a "capture event" is an instance in which a visual representation of a graphical user interface is recorded. Capture event 114 may be triggered manually by a user input and/or automatically by predefined system conditions, such as detecting an abnormality within the medical time-series data 108, such as the ECG data. As used in this disclosure, a "user command" is an input action from a user that causes the computing device to perform an action. In some embodiments, user command may trigger capture event 114. The user command 116 may include, but is not limited to, a key press, touch gesture, voice command, or mouse click that signals the system to capture and store a visual representation of a portion of the graphical user interface 106. For example, without limitation, the user command 116 may be a mouse click or a keyboard button command, prompting the system to take a screenshot and save it to a designated storage location.

With continued reference to FIG. 1, the first user command 116 may include an input 118 from a peripheral device 120. As used in this disclosure, an "input" is a signal, command, or data entry received by a system from a user, device, and/or external source to initiate a process or trigger a response. An input 118 may include, but is not limited to, keyboard presses, touch gestures, voice commands, mouse clicks, sensor readings, API requests, or transmitted data packets. For example, in a graphical user interface 106 (GUI), an input 118 may be a tap on a touchscreen button, which causes the system to execute a corresponding function, such as opening a menu or capturing a screenshot. As used in this disclosure, a "peripheral device" is an external or auxiliary hardware component that communicates with a computing system to provide input, output, or additional functionality. A peripheral device 120 may include, but is not limited to, keyboards, mice, touchpads, styluses, external cameras, microphones, game controllers, biometric scanners, and the like. The first user command 116 may include an input 118 from a peripheral device 120, such as a keystroke from an external keyboard or a button press on a connected stylus, initiating a capture event 114.

With continued reference to FIG. 1, the capture event 114 comprises detecting, using the at least a processor 102 and an event handler 110, the first user command 116, accessing, using the at least a processor 102, a framebuffer 122 by retrieving pixel data 124 displayed on the graphical user interface 106, triggering, using user settings 126, a file save operation 128, and displaying, using the at least a processor 102, at least a virtual confirmation 130 associated with the capture event 114. As used in this disclosure, a "framebuffer" is a memory buffer that temporarily stores data representing an image or graphical content displayed on a screen. The framebuffer 122 may be accessed by the at least a processor 102 to retrieve and process visual elements 112 for rendering, manipulation, or storage. As used in this disclosure, "pixel data" is a collection of digital values that define the color, brightness, and positioning of individual pixels on a display. Pixel data 124 may be stored in a framebuffer 122 and retrieved to generate an image, modify graphical content, or execute a screen capture event. As used in this disclosure, "user settings" are configurable parameters that dictate how a system performs specific functions based on user preferences. User settings 126 may include, but are not limited to, file storage location, image format such as, PNG, JPEG, and the like, resolution, notification preferences, and shortcut configurations for triggering a screen capture event. As used in this disclosure, a "file save operation" is a system-executed process that stores captured data, such as a screen capture, into a designated storage location in a predefined format. The file save operation 128 may involve retrieving pixel data 124, compressing or encoding the image, assigning a file name, and writing the data to local or cloud-based storage. As used in this disclosure, a "virtual confirmation" is a system-generated visual or auditory indication that confirms a completed action, such as a successful screen capture event. Virtual confirmation 130 may include on-screen pop-ups, animations, haptic feedback, audio alerts, or status bar notifications, ensuring that the user receives real-time feedback on the capture event 114. In an embodiment, a smartphone-based heart monitoring app may continuously render real-time ECG waveforms on the screen. The framebuffer 122 may temporarily hold this live ECG data visualization, allowing the system to retrieve and process the pixel data 124 for further analysis or a capture event 114. In another non-limiting example, the apparatus 100 may render QRS complexes and heart rate trends as a series of fluctuating lines and numerical values on the screen. When a screen capture event is triggered, the processor 102 may retrieve pixel data 124 corresponding to the ECG waveform from the framebuffer 122 to generate an image of the heart rhythm for medical review. Without limitation, a cardiologist may configure user settings 126 of a hospital-grade ECG monitoring system on a desktop computer to automatically save screen captures of ECG events in DICOM format, store them in a specific patient folder, or apply a timestamp overlay. Similarly, on a smartphone ECG tracking app, a user may adjust settings to trigger screen captures with a double-tap gesture and store them in a HIPAA-compliant cloud storage system. In another non-limiting example, if an anomaly such as atrial fibrillation is detected, the system may automatically capture the ECG waveform from the framebuffer 122, compress it into a lossless PNG or medical-grade DICOM file, and store it in an encrypted patient record system. Continuing, on a smartphone, a user may manually trigger the capture of an ECG graph, and the system may execute a file save operation 128, storing the image in the device gallery or cloud-based patient portal. Without limitation, if a nurse captures an ECG rhythm strip from a computer screen, the apparatus 100 may display the virtual confirmation 130 which may include a pop-up message confirming that the image has been saved to the patient file. Continuing, on a smartphone-based heart health app, after a user takes a screenshot of an ECG report, the virtual confirmation 130 may include a haptic vibration and an on-screen toast notification may confirm that the capture was successful, ensuring that the data is properly recorded for further review.

Still referring to FIG. 1, processor 102 is configured to generate, as a function of the capture event 114, digital image data 132, wherein the digital image data 132 comprises a window 134 of the graphical user interface 106. As used in this disclosure, "digital image data" is a collection of pixel-based visual information that represents a captured image in a computing system. Digital image data 132 may include color values, resolution, metadata, and graphical elements displayed within the graphical user interface 106. The digital image data 132 may be stored in formats such as JPEG, PNG, or DICOM for medical applications. As used in this disclosure, a "window" is a defined section of a graphical user interface 106 that displays visual data within a computing environment. A window 134 may be resizable, movable, or layered, and may contain text, images, graphs, or user input fields that are relevant to an application's function. For example, without limitation, the capture event 114 may occur when a physician selects a button to save a specific window 134 displaying the medical time-series data 108 such as live ECG waveform, generating digital image data 132 that captures the current heart rhythm trends for documentation. In another non-limiting example, in a hospital workstation displaying multiple patient records, the processor 102 may selectively generate digital image data 132 of only the active window 134 containing a single patient's ECG data, ensuring privacy by excluding other patients' information. A wearable cardiac monitoring device may also generate digital image data 132 of a diagnostic window 134 displaying arrhythmia alerts when the system detects an irregular heartbeat. Without limitation, by capturing the window 134 or a portion of the graphical user interface 106, instead of the full screen, the apparatus 100 may enhance data precision, security, and usability within medical and diagnostic environments.

With continued reference to FIG. 1, the at least a processor 102 is further configured to store the digital image data 132, the corresponding extracted cardiac metrics 136, and the classification 154 in a structured database 138. As used in this disclosure, "cardiac metrics" are physiological measurements related to heart function. In an embodiment, the cardiac metrics 136 may be derived from cardiac monitoring systems, medical imaging, and/or biometric sensors. Cardiac metrics 136 may include, but are not limited to, heart rate (HR), heart rate variability (HRV), QRS complex duration, PR interval, ST-segment elevation, QT interval, ejection fraction, cardiac output, and the like. Without limitation, cardiac metrics 136 may be used in diagnosing cardiovascular conditions, assessing heart rhythm irregularities, monitoring patient health trends, and guiding medical interventions.

With continued reference to FIG. 1, as used in this disclosure, a "structured database" is a systematically organized data storage system. In an embodiment, the structured database 138 may use predefined schemas, tables, and relationships to store, manage, and retrieve information efficiently. A structured database 138 may be implemented using relational database management systems (RDBMS) such as MySQL, PostgreSQL, or Microsoft SQL Server, allowing for structured queries using SQL (Structured Query Language). Data within the structured database 138 may be organized into tables with defined columns and data types, enabling fast indexing, validation, and retrieval. For example, in a hospital's electronic health record (EHR) system, a structured database 138 may store patient demographics, medical history, lab results, and cardiac metrics 136 in separate, interrelated tables for secure and efficient access. In an embodiment, a clinician monitoring a patient's ECG on a centralized cardiac workstation may trigger the capture event 114 when a patient experiences ST-segment elevation, indicating a possible heart attack. The apparatus 100 may store the captured ECG waveform window 134 along with extracted ST-segment elevation values, QT interval duration, and current blood pressure readings in the structured database 138, ensuring a complete record for cardiologists to review during emergency intervention.

Still referring to FIG. 1, processor 102 is configured to verify, using user confirmation 140, the window 134 of the graphical user interface 106. As used in this disclosure, "user confirmation" is a system-generated prompt requiring explicit action from a user to verify an operation. Without limitation, the user confirmation 140 may include clicking an "OK" button, selecting a checkbox, entering a password, providing biometric authentication, or responding to a pop-up notification. For example, in a medical ECG monitoring application, after a healthcare provider initiates a capture event 114 through the user input 118 of the peripheral device 120, such as a mouse click, the apparatus 100 may capture the medical time-series data 108 which may include a portion of the ECG screen, the apparatus 100 may then present the user confirmation 140 dialog box asking whether to save the image to the structured database 138 of a specific patient, ensuring intentional data storage and compliance with medical documentation protocols. In another embodiment, a cardiologist monitoring the ECG data of a patient during an ablation procedure may trigger the capture event 114 to store a critical arrhythmia episode. After the window 134 has been captured, the apparatus 100 may present the user confirmation 140 which may include a pop-up displaying the captured window 134 of the GUI, asking, "Confirm ECG capture for patient record?" The physician may click "Confirm" to proceed or "Retake" if the digital image is unclear. In another non-limiting example, during a cardiac ablation procedure, an electrophysiologist may use real-time ECG mapping software to visualize electrical signals and pinpoint areas of the heart causing arrhythmias. Continuing, when the physician initiates a capture event 114, and the processor 102 captures a window 134 of the ECG data displaying pre-ablation atrial fibrillation patterns, the apparatus 100 may prompt the user confirmation 140 which may include a dialog stating, "Confirm ECG snapshot before proceeding with ablation?" The physician may click "Confirm" to save the digital image to the structured database or "Redo" if another view is needed.

With continued reference to FIG. 1, in another non-limiting example, while applying radiofrequency (RF) or cryoablation energy, the apparatus 100 may automatically capture the window 134 of the showing real-time temperature, impedance, and lesion formation data. Continuing, before finalizing the recording, the apparatus 100 may generate the user confirmation 140 which may include a confirmation pop-up, prompting the operator to "Confirm lesion data capture for procedural log?" The clinician may approve the capture event 114 to ensure compliance with procedural documentation or discard it if inaccurate. In another non-limiting example, after completing an ablation, the apparatus 100 may capture a post-procedure ECG window 134 to compare with pre-ablation electrical activity. Without limitation, the user confirmation 140 may include a confirmation message asking, "Confirm post-ablation ECG capture for patient report?" The electrophysiologist may review the digital image data 132 or the captured GUI image, validate that arrhythmias have been eliminated, and approve the user confirmation 140, ensuring proper documentation before concluding the procedure.

Still referring to FIG. 1, processor 102 is configured to process, using one or more analysis models 142, the digital image data 132, wherein processing the digital image data 132 comprises extracting at least a cardiac metric 136 from the digital image data 132. As used in this disclosure, "analysis models" are computational frameworks, algorithms, or machine-learning models designed to process data. The one or more analysis models 142 may include, but are not limited to, statistical models, predictive models, machine learning models, pattern recognition algorithms, signal processing techniques, and any combination thereof. Without limitation, the one or more analysis models 142 may be used in various applications, such as detecting anomalies in ECG waveforms, predicting patient outcomes, optimizing medical workflows, classifying physiological patterns, and the like. For example, without limitation, in a cardiac ablation procedure, the one or more analysis models 142 may evaluate pre- and post-ablation ECG data to determine the effectiveness of lesion formation and the reduction of arrhythmic activity.

With continued reference to FIG. 1, in a non-limiting example, the one or more analysis models 142 may be consistent with one or more aspects of the algorithms described in U.S. patent application Ser. No. 18/591,499, filed on Feb. 29, 2024, titled "APPARATUS AND METHOD FOR TIME SERIES DATA FORMAT CONVERSION AND ANALYSIS," which is incorporated by reference herein in its entirety.

With continued reference to FIG. 1, in a non-limiting example, the one or more analysis models 142 may be consistent with one or more aspects of the algorithms described in U.S. patent application Ser. No. 18/599,435, filed on Mar. 8, 2024, titled "APPARATUS AND METHOD FOR GENERATING A QUALITY DIAGNOSTIC OF ECG (ELECTROCARDIOGRAM) DATA," which is incorporated by reference herein in its entirety.

With continued reference to FIG. 1, in a non-limiting example, the one or more analysis models 142 may be consistent with one or more aspects of the algorithms described in U.S. patent application Ser. No. 18/641,217, filed on Apr. 19, 2024, titled "SYSTEMS AND METHODS FOR TRANSFORMING ELECTROCARDIOGRAM IMAGES FOR USE IN ONE OR MORE MACHINE LEARNING MODELS," which is incorporated by reference herein in its entirety.

With continued reference to FIG. 1, in a non-limiting example, the one or more analysis models 142 may be consistent with one or more aspects of the algorithms described in U.S. patent application Ser. No. 18/652,364, filed on May 1, 2024, titled "APPARATUS AND METHOD FOR TRAINING A MACHINE LEARNING MODEL TO AUGMENT SIGNAL DATA AND IMAGE DATA," which is incorporated by reference herein in its entirety.

With continued reference to FIG. 1, in a non-limiting example, the one or more analysis models 142 may be consistent with one or more aspects of the algorithms described in U.S. patent application Ser. No. 16/754,007, filed on Apr. 6, 2020, titled "ECG-BASED CARDIAC EJECTION-FRACTION SCREENING," which is incorporated by reference herein in its entirety.

With continued reference to FIG. 1, in a non-limiting example, the one or more analysis models 142 may be consistent with one or more aspects of the algorithms described in U.S. patent application Ser. No. 17/275,276, filed on Mar. 11, 2021, titled "NEURAL NETWORKS FOR ATRIAL FIBRILLATION SCREENING," which is incorporated by reference herein in its entirety.

With continued reference to FIG. 1, in a non-limiting example, the one or more analysis models 142 may be consistent with one or more aspects of the algorithms described in U.S. patent application Ser. No. 18/151,673, filed on Jan. 9, 2023, titled "NONINVASIVE METHODS FOR QUANTIFYING AND MONITORING LIVER DISEASE SEVERITY," which is incorporated by reference herein in its entirety.

With continued reference to FIG. 1, in a non-limiting example, the one or more analysis models 142 may be consistent with one or more aspects of the algorithms described in U.S. patent application Ser. No. 18/642,200, filed on Apr. 22, 2024, titled "SYSTEM AND A METHOD FOR SCREENING FOR CARDIAC AMYLOIDOSIS BY ELECTROCARDIOGRAPHY," which is incorporated by reference herein in its entirety.

With continued reference to FIG. 1, in a non-limiting example, the one or more analysis models 142 may be consistent with one or more aspects of the algorithms described in U.S. patent application Ser. No. 18/642,012, filed on Apr. 22, 2024, titled "SYSTEM AND A METHOD FOR ELECTROCARDIOGRAPHIC PREDICTION OF COMPUTED TOMOGRAPHY-BASED HIGH CORONARY CALCIUM SCORE (CAC)," which is incorporated by reference herein in its entirety.

With continued reference to FIG. 1, in a non-limiting example, the one or more analysis models 142 may be consistent with one or more aspects of the algorithms described in U.S. patent application Ser. No. 18/648,292, filed on Apr. 26, 2024, titled "METHOD AND AN APPARATUS FOR DETECTING A LEVEL OF CARDIOVASCULAR DISEASE," which is incorporated by reference herein in its entirety.

With continued reference to FIG. 1, in a non-limiting example, the one or more analysis models 142 may be consistent with one or more aspects of the algorithms described in U.S. patent application Ser. No. 16/960,236, filed on Jul. 6, 2020, titled "ECG-BASED AGE AND SEX ESTIMATION," which is incorporated by reference herein in its entirety.

With continued reference to FIG. 1, in a non-limiting example, the one or more analysis models 142 may be consistent with one or more aspects of the algorithms described in U.S. patent application Ser. No. 13/810,064, filed on Mar. 29, 2013, titled "NON-INVASIVE MONITORING OF PHYSIOLOGICAL CONDITIONS," which is incorporated by reference herein in its entirety.

With continued reference to FIG. 1, in a non-limiting example, the one or more analysis models 142 may be consistent with one or more aspects of the algorithms described in U.S. patent application Ser. No. 15/778,405, filed on May 23, 2018, titled "PROCESSING PHYSIOLOGICAL ELECTRICAL DATA FOR ANALYTE ASSESSMENTS," which is incorporated by reference herein in its entirety.

With continued reference to FIG. 1, in a non-limiting example, the one or more analysis models 142 may be consistent with one or more aspects of the algorithms described in U.S. patent application Ser. No. 15/842,419, filed on Dec. 14, 2017, titled "SYSTEMS AND METHODS OF ANALYTE MEASUREMENT ANALYSIS," which is incorporated by reference herein in its entirety.

With continued reference to FIG. 1, in a non-limiting example, the one or more analysis models 142 may be consistent with one or more aspects of the algorithms described in U.S. patent application Ser. No. 18/517,640, filed on Nov. 22, 2023, titled "SYSTEM AND APPARATUS FOR GENERATING IMAGING INFORMATION BASED ON AT LEAST A SIGNAL," which is incorporated by reference herein in its entirety.

With continued reference to FIG. 1, in a non-limiting example, the one or more analysis models 142 may be consistent with one or more aspects of the algorithms described in U.S. patent application Ser. No. 17/500,287, filed on Oct. 13, 2021, titled "NONINVASIVE METHODS FOR DETECTION OF PULMONARY HYPERTENSION," which is incorporated by reference herein in its entirety.

With continued reference to FIG. 1, in a non-limiting example, the one or more analysis models 142 may be consistent with one or more aspects of the algorithms described in U.S. patent application Ser. No. 17/552,246, filed on Dec. 15, 2021, titled "SYSTEMS AND METHODS FOR DIAGNOSING A HEALTH CONDITION BASED ON PATIENT TIME SERIES DATA," which is incorporated by reference herein in its entirety.

With continued reference to FIG. 1, in a non-limiting example, the one or more analysis models 142 may be consistent with one or more aspects of the algorithms described in U.S. patent application Ser. No. 18/229,854, filed on Aug. 3, 2023, titled "APPARATUS AND METHOD FOR DETERMINING A PATIENT SURVIVAL PROFILE USING ARTIFICIAL INTELLIGENCE-ENABLED ELECTROCARDIOGRAM (ECG)," which is incorporated by reference herein in its entirety.

With continued reference to FIG. 1, in a non-limiting example, the one or more analysis models 142 may be consistent with one or more aspects of the algorithms described in U.S. patent application Ser. No. 18/230,043, filed on Aug. 3, 2023, titled "APPARATUS AND A METHOD FOR GENERATING A DIAGNOSTIC LABEL," which is incorporated by reference herein in its entirety.

With continued reference to FIG. 1, in a non-limiting example, the one or more analysis models 142 may be consistent with one or more aspects of the algorithms described in U.S. patent application Ser. No. 18/592,680, filed on Mar. 1, 2024, titled "APPARATUS AND METHOD FOR TRAINING AN ARTIFICIAL INTELLIGENCE-SUPPORTED DIAGNOSTIC ASSESSMENT TOOL," which is incorporated by reference herein in its entirety.

With continued reference to FIG. 1, in a non-limiting example, the one or more analysis models 142 may be consistent with one or more aspects of the algorithms described in U.S. patent application Ser. No. 18/595,645, filed on Mar. 5, 2024, titled "SYSTEM, METHOD, AND APPARATUS FOR IDENTIFYING CONGENITAL LONG QT SYNDROME IN A SUBJECT," which is incorporated by reference herein in its entirety.

With continued reference to FIG. 1, in a non-limiting example, the one or more analysis models 142 may be consistent with one or more aspects of the algorithms described in U.S. patent application Ser. No. 18/666,116, filed on May 16, 2024, titled "APPARATUS AND METHOD FOR GENERATING CARDIAC CATHETERIZATION DATA," which is incorporated by reference herein in its entirety.

With continued reference to FIG. 1, in a non-limiting example, the one or more analysis models 142 may be consistent with one or more aspects of the algorithms described in U.S. patent application Ser. No. 18/907,123, filed on Oct. 4, 2024, titled "APPARATUS AND METHOD FOR SUBJECT MONITORING AND DIAGNOSING WITH NON-INVASIVE MEASURES," which is incorporated by reference herein in its entirety.

With continued reference to FIG. 1, in a non-limiting example, the one or more analysis models 142 may be consistent with one or more aspects of the algorithms described in U.S. patent application Ser. No. 18/666,363, filed on May 16, 2024, titled "APPARATUS AND METHOD FOR LEFT VENTRICULAR EJECTION FRACTION PREDICTION," which is incorporated by reference herein in its entirety.

With continued reference to FIG. 1, in a non-limiting example, the one or more analysis models 142 may be consistent with one or more aspects of the algorithms described in U.S. patent application Ser. No. 18/641,150, filed on Apr. 19, 2024, titled "APPARATUS AND METHODS FOR AUTOMATIC SUGGESTION OF ATRIAL FIBRILLATION CASES BASED ON A PRESENCE OF ABNORMAL PULMONARY VEIN ANATOMY," which is incorporated by reference herein in its entirety.

With continued reference to FIG. 1, in a non-limiting example, the one or more analysis models 142 may be consistent with one or more aspects of the algorithms described in U.S. patent application Ser. No. 18/809,611, filed on Aug. 20, 2024, titled "APPARATUS AND METHODS FOR PREDICTION OF REPEAT ABLATION EFFICACY," which is incorporated by reference herein in its entirety.

With continued reference to FIG. 1, in a non-limiting example, the one or more analysis models 142 may be consistent with one or more aspects of the ECG-AI panels described in U.S. patent application Ser. No. 18/395,399, filed on Dec. 22, 2023, titled "METHODS AND APPARATUSES FOR SYNTHESIZING TIME SERIES DATA AND DIAGNOSTIC DATA," which is incorporated by reference herein in its entirety.

With continued reference to FIG. 1, in a non-limiting example, the one or more analysis models 142 may be consistent with one or more aspects of the ECG-AI panels described in U.S. patent application Ser. No. 18/750,336, filed on Jun. 21, 2024, titled "SYSTEMS AND METHODS FOR TRACKING CARDIAC VALUES," which is incorporated by reference herein in its entirety.

With continued reference to FIG. 1, in a non-limiting example, the one or more analysis models 142 may be consistent with one or more aspects of the ECG-AI panels described in U.S. patent application Ser. No. 18/771,914 filed on Jul. 12, 2024, titled "APPARATUS AND METHODS FOR IDENTIFYING ABNORMAL BIOMEDICAL FEATURES WITHIN IMAGES OF BIOMEDICAL DATA," which is incorporated by reference herein in its entirety.

With continued reference to FIG. 1, in a non-limiting example, the one or more analysis models 142 may be consistent with one or more aspects of the ECG-AI panels described in U.S. patent application Ser. No. 18/771,678, filed on Jul. 12, 2024, titled "APPARATUS AND METHOD FOR DETECTING HYPERTENSION ATTRIBUTES," which is incorporated by reference herein in its entirety.

With continued reference to FIG. 1, in a non-limiting example, the one or more analysis models 142 may be consistent with one or more aspects of the ECG-AI panels described in U.S. patent application Ser. No. 18/771,472, filed on Jul. 12, 2024, titled "APPARATUS AND A METHOD FOR IDENTIFYING THE PROGRESSION OF CORONARY HEART DISEASE," which is incorporated by reference herein in its entirety.

With continued reference to FIG. 1, in a non-limiting example, the one or more analysis models 142 may be consistent with one or more aspects of the ECG-AI panels described in U.S. patent application Ser. No. 18/773,302, filed on Jul. 15, 2024, titled "APPARATUS AND METHOD FOR DETERMINING WOMENS HEALTH ATTRIBUTES IN FEMALE CLASSIFICATION TIME-SERIES DATA," which is incorporated by reference herein in its entirety.

With continued reference to FIG. 1, in a non-limiting example, the one or more analysis models 142 may be consistent with one or more aspects of the ECG-AI panels described in U.S. patent application Ser. No. 18/773,195, filed on Jul. 15, 2024, titled "APPARATUS AND METHOD FOR GENERATING A PREOPERATIVE DATA STRUCTURE USING A PRE-OPERATIVE PANEL," which is incorporated by reference herein in its entirety.

With continued reference to FIG. 1, processing the digital image data 132 using the one or more analysis models 142 may further include comparing, using the one or more analysis models 142, the digital image data 132 to target data 144, identifying, using the one or more analysis models 142, the at least a cardiac metric 136 as a function of a comparison 146 of the digital image data 132 to the target data 144, and extracting, using the one or more analysis models 142, the at least a cardiac metric 136 using the comparison 146 of the digital image data 132 to the target data 144. As used in this disclosure, "target data" is reference dataset, baseline measurements, and/or predefined standards used for comparison 146 in an analysis model to evaluate data. Target data 144 may include, but is not limited to, pre-recorded ECG waveforms, normative cardiac metric 136 ranges, historical patient data, machine-learning-trained models of typical heart rhythms, and the like. For example, the target data 144 may be a database of normal and abnormal ECG patterns, allowing for comparison 146 with real-time patient data to detect anomalies. As used in this disclosure, a "comparison" is the evaluation of differences or similarities between two or more sets of data. In an embodiment, the comparison 146 may be used to identify patterns, deviations, and/or correlations. Without limitation, the comparison 146 may involve statistical analysis, signal processing, machine learning algorithms, pattern recognition techniques, and the like to determine variations between new input data and predefined target data 144. For example, the comparison 146 may involve detecting prolonged QT intervals in a patient's ECG waveform by measuring deviations from a predefined target QT range stored in a clinical reference database. Without limitation, the at least a processor 102 may compare the digital image data 132 of a captured ECG waveform against target ECG datasets, baseline normal cardiac patterns, patient-specific historical ECG data, and the like. For example, without limitation, in a cardiac ablation procedure, the apparatus may compare a pre-ablation ECG window 134 to a post-ablation ECG window 134, analyzing changes in atrial fibrillation burden, P-wave morphology, QRS dispersion, and the like to assess treatment effectiveness. The at least a processor 102 may use machine-learning models or statistical algorithms to extract key cardiac metrics 136 based on differences between the captured ECG waveform and the target data 144. For example, without limitation, if an ECG image captured from a real-time electrophysiology (EP) system is compared against a healthy sinus rhythm template, the apparatus 100 may identify prolonged PR intervals, increased heart rate variability, or ST-segment elevation, signaling a potential conduction delay or ischemic event.

With continued reference to FIG. 1, the one or more analysis models 142 comprise at least a machine learning model 148, wherein the at least a machine learning model 148 is configured to apply an electrocardiogram algorithm 150 to the digital image data 132. As used in this disclosure, an "electrocardiogram (ECG) algorithm" is a computational model or set of programmed instructions designed to process ECG data to extract cardiac metrics 136. In an embodiment the ECG algorithm 150 may detect abnormalities or classify heart rhythms. Without limitation, the ECG algorithm 150 may utilize signal processing techniques, feature extraction methods, machine learning models, and/or statistical analysis to evaluate waveform characteristics such as P-wave morphology, QRS complex duration, ST-segment elevation, and heart rate variability (HRV). For example, an ECG algorithm 150 may apply Fourier Transform or wavelet analysis to filter noise and enhance signal quality before detecting arrhythmias like atrial fibrillation or ventricular tachycardia. In an embodiment, the machine learning model 148 may process the captured ECG waveform by recognizing patterns, filtering noise, and/or extracting key cardiac metrics 136, such as heart rate variability (HRV), QRS complex duration, and ST-segment deviations. For example, without limitation, the machine learning model 148 may be trained on a dataset of labeled ECG images to identify arrhythmias such as atrial fibrillation or ventricular tachycardia by comparing waveform structures to previously classified cases. Additionally and or alternatively, the machine learning model 148 may enhance diagnostic accuracy by applying deep learning-based image segmentation to isolate key ECG features, allowing for precise extraction of PR intervals, T-wave morphology, and QT prolongation indicators. Without limitation, by leveraging the machine learning model 148 with includes the ECG algorithm 150, the apparatus 100 may facilitate real-time cardiac assessment, improve anomaly detection, and assist clinicians in making informed decisions based on extracted cardiac metrics 136.

Still referring to FIG. 1, processor 102 is configured to generate, using the analysis module, output data 152 based on the at least a cardiac metric 136 extracted from the digital image data 132. As used in this disclosure, "output data" is processed information generated by a system based on extracted or computed metrics from the input data. Output data 152 may include, but is not limited to, numerical values, graphical representations, diagnostic indicators, predictive assessments, and/or formatted reports that provide insights derived from the original dataset. For example, without limitation, the output data 152 may provide clinicians, patients, or monitoring systems with interpretable results derived from the processed ECG waveform. In another non-limiting example, the at least a processor 102 may extract heart rate variability (HRV) and QRS complex duration from an ECG image and generate output data 152 in the form of a numerical report indicating whether the patient's HRV is within normal physiological ranges. The apparatus 100 may further classify irregularities in the QRS complex, providing an automated alert if conduction abnormalities are detected. In another instance, the at least a processor 102 may analyze real-time digital image data 162 of an ECG waveform and generate output data 152 in the form of a color-coded risk assessment. If the apparatus 100 detects prolonged QT intervals, it may generate a red warning alert and recommend immediate physician review, while normal ECG activity may generate a green confirmation indicator for reassurance. Additionally and or alternatively, the at least a processor 102 may apply a trained model to extracted ST-segment deviations and P-wave morphology data to generate output data 152 in the form of an AI-generated diagnosis suggestion. The apparatus 100 may present a probability score indicating whether the extracted ECG patterns align with conditions such as early-stage myocardial infarction or atrial fibrillation, allowing clinicians to validate findings before making a final assessment. Without limitation, by leveraging the output data 152 derived from ECG analysis, the system may enhance clinical decision-making, improve real-time cardiac monitoring, and provide structured, actionable insights for healthcare professionals and patients alike.

With continued reference to FIG. 1, the at least a processor 102 may be configured to display, using one or more visual elements 112, the output data 152 in the graphical user interface 106, wherein the output data 152 comprises the comparison 146 between the digital image data 132 with the target data 144. In an embodiment, the one or more visual elements 112 may be displayed on the graphical user interface 106 during a cardiac ablation procedure, allowing electrophysiologists to monitor and interact with real-time ECG data and catheter positioning. For example, without limitation, the apparatus 100 may present an ECG waveform display as a primary visual element 112, showing real-time cardiac activity before, during, and after ablation, with automated markers indicating detected arrhythmias such as atrial fibrillation or ventricular tachycardia. Additionally and or alternatively, the GUI may include the one or more visual elements 112 such as a 3D anatomical heart map with color-coded lesion markers, visually representing ablation progress and active treatment zones. Without limitation, the apparatus 100 may further incorporate the one or more visual elements 112 such as dynamic overlays and numerical indicators to provide temperature, impedance, energy delivery metrics in real time, ensuring that ablation is being performed safely and effectively. In an embodiment, a progress bar or procedural timer may serve as the one or more visual elements 112 to track elapsed time for lesion formation, ensuring compliance with recommended ablation duration. Continuing, if an unexpected cardiac event, such as prolonged QT intervals or excessive heart rate variability, is detected, the apparatus 100 may generate flashing alerts or pop-up warnings as visual elements 112, prompting immediate clinician intervention.

With continued reference to FIG. 1, in an embodiment, the apparatus 100 may overlay the target data 144 onto the digital image such as a screenshot of the window 134 of a GUI showing ECG data to facilitate comparative analysis, interpretation, and annotation. The one or more visual elements 112 may include text-based data, graphical indicators, and/or another generated image to enhance visualization and provide real-time insights. For example, without limitation, during a cardiac ablation procedure, the apparatus 100 may include the one or more visual elements 112 such as overlaying a previously recorded baseline ECG waveform, serving as the target data 144, onto a real-time ECG screenshot, allowing the electrophysiologist to compare pre- and post-ablation heart activity. Similarly, a semi-transparent anatomical map may be overlaid onto the ablation interface, highlighting targeted arrhythmia sites and previously ablated regions, ensuring precise lesion placement. Additionally and or alternatively, the apparatus 100 may overlay numerical annotations onto a captured ECG image, displaying extracted cardiac metrics 136 such as QT interval duration, ST-segment elevation, or heart rate variability. Continuing, if a significant deviation from target data 144 is detected, the overlay may include a color-coded risk indicator, visually guiding clinicians toward areas requiring further evaluation or intervention.

With continued reference to FIG. 1, the output data 152 comprises a classification 154 based on extracted cardiac metrics 136 from the digital image data 132, wherein the classification 154 is assessed by classifying the digital image data 132 using one or more cardiac metric labels 156 and generating classification scores 158 associated with the classification 154 by comparing the one or more cardiac metric labels 156 to historical labeled digital image data 160. As used in this disclosure, "classification" is the process of categorizing data into predefined groups based on extracted features. In an embodiment, the classification 154 may be performed using machine learning models, pattern recognition algorithms, rule-based systems, and any combination thereof, which may enable automated identification and differentiation of data. For example, without limitation, the classification 154 may involve categorizing a captured ECG waveform as "normal sinus rhythm," "atrial fibrillation," or "ventricular tachycardia" based on extracted cardiac features. As used in this disclosure, "cardiac metric labels" are predefined categories or reference identifiers assigned to extracted cardiac metrics 136 to facilitate classification 154 and comparison. Cardiac metric labels 156 may correspond to specific heart conditions, waveform abnormalities, and/or clinical thresholds. For example, without limitation, a QT interval measurement extracted from the digital image data 132 may be assigned a label such as "normal," "borderline prolonged," or "prolonged", allowing the system to classify the patient's cardiac state accurately. As used in this disclosure, "classification scores" are quantitative values that represent the confidence level of a classification 154 result. In an embodiment, the classification scores 158 may be based on the comparison of extracted cardiac metrics 136 to reference data. Classification scores 158 may be computed using probabilistic models, similarity metrics, machine learning confidence assessments, and any combination thereof. For instance, without limitation, the classification score 158 of 95% for "atrial fibrillation" may indicate a high level of confidence in the system's ECG analysis, while a 60% score for "sinus arrhythmia" may suggest further review is needed. As used in this disclosure, "historical labeled digital image data" is a dataset of previously captured digital images that have been annotated with verified cardiac metric 136 classifications 154 for reference. Without limitation the historical labeled digital image data 160 may include ECG waveforms, annotated medical scans, and/or graphical representations of physiological signals with corresponding expert-verified labels. For example, without limitation, a historical database may contain thousands of ECG images labeled as "normal," "atrial flutter," or "ventricular fibrillation," serving as a training set for automated classification models. In a non-limiting example, the at least a processor 102 may extract P-wave duration, QRS complex width, and ST-segment elevation from an ECG waveform captured as the digital image data 132. The apparatus 100 may then assign cardiac metric labels 156 such as "normal conduction," "prolonged QRS," or "ischemic changes" and compute classification scores 158 by comparing the extracted cardiac metrics 136 to a database of historical labeled digital image data 160 such as ECG images. Continuing, if a patient's extracted ST-segment elevation closely matches a historical labeled digital image data 160 of myocardial infarction cases, the apparatus 100 may classify the ECG as "STEMI" (ST-elevation myocardial infarction) with a 97% classification score 158, prompting an immediate clinical alert.

With continued reference to FIG. 1, the at least a processor 102 is further configured to receive real-time digital image data 162 from a continuous capture stream 164 and dynamically update the output data 152 as additional cardiac metrics 136 are extracted. As used in this disclosure, "real-time digital image data" is a continuously updated visual representation of graphical information that is processed in real time within a computing system. Real-time digital image data 162 may include, without limitation, dynamic visualizations, time-series graphical outputs, and/or continuously refreshed screenshots generated from a live data stream. For example, without limitation, in a cardiac ablation procedure, real-time digital image data 162 may comprise live ECG waveforms, anatomical heart maps, and catheter positioning overlays, updating instantaneously as the procedure progresses. Without limitation, real-time digital image data 162 may display a continuously refreshed view of a patient's cardiac activity, allowing for immediate detection of arrhythmias, ischemic events, or abnormal QT prolongation. As used in this disclosure, a "continuous capture stream" is a real-time data acquisition process that continuously records, processes, and transmits digital image data without interruption. The continuous capture stream 164 may include live video feeds, sequential frame captures, or continuously updated screenshots that enable dynamic monitoring and analysis of graphical information.

With continued reference to FIG. 1, the output data 152 further comprises an alert signal 166 generated based on a deviation 168 of the at least a cardiac metric 136 from a predefined threshold 170, wherein the alert signal 166 is visually or audibly presented in the graphical user interface 106 of a remote device. As used in this disclosure, an "alert signal" is a system-generated notification that indicates an event requiring attention. In an embodiment, the alert signal 166 may be presented as a visual, auditory, or haptic cue within the GUI. Without limitation, the alert signal 166 may include flashing indicators, color-coded warnings, pop-up notifications, alarm sounds, and/or vibration feedback, and the like, to inform a user of a critical condition or required action. As used in this disclosure, a "deviation" is a measured difference between an observed value and a predefined reference point. In an embodiment, the deviation 168 may indicate a variation from expected or normal conditions. Without limitation, the deviation 168 may be calculated using statistical thresholds, trend analysis, machine learning-based anomaly detection, and the like. For example, without limitation, a prolonged QT interval detected in an ECG waveform may be identified as the deviation 168 from the standard reference range, signaling potential cardiac risk. As used in this disclosure, a "predefined threshold" is an established set value, range, or condition. In an embodiment, the predefined threshold 170 may be set by clinical guidelines, historical data, and/or machine learning models. In an embodiment, the predefined threshold 170 may serve as a reference for evaluating the deviation 168 in monitored parameters. For example, without limitation, the predefined thresholds 170 may include normal heart rate ranges (e.g., 60-100 bpm), maximum allowable QT interval duration (e.g., >450 ms in males, >470 ms in females), and/or acceptable ST-segment elevation levels, which, when exceeded, may trigger alert signal 166. In another embodiment, if a patient's heart rate drops below 40 bpm (bradycardia) or exceeds 180 bpm (tachycardia), the apparatus 100 may display a pop-up notification in the clinician's dashboard, accompanied by a distinctive alert chime, ensuring real-time awareness of the cardiac event.

With continued reference to FIG. 1, as used in this disclosure, a "remote device" is a device that is physically separate from a primary system but is capable of communicating with it through a connection. In an embodiment, the remote device may include computing devices such as smartphones, tablets, laptops, medical imaging systems, IoT sensors, or cloud-based servers that transmit or receive data over a network. As used in this disclosure, "downstream device" is a device that accesses and interacts with apparatus 100. For instance, and without limitation, downstream device may include a remote device and/or apparatus 100. In a non-limiting embodiment, downstream device may be consistent with a computing device as described in the entirety of this disclosure. Without limitation, the downstream device may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the alert signal 166 may include displaying the alert signal 166 at display device using a visual interface.

Still referring to FIG. 1, the at least a processor 102 may be configured to transmit, using at least a network, the digital image data and the corresponding extracted cardiac metrics to a third-party system. As used in this disclosure, a "network" is a system of interconnected computing resources that facilitate communication and data exchange between systems. Without limitation, the network may include wired or wireless connections, enabling data transmission across local or distributed environments. For example, without limitation, the network may include a local area network (LAN), which connects devices within a building or office, a wide area network (WAN), which connects geographically dispersed locations via the internet, or a wireless network, such as Wi-Fi or cellular networks, which allow mobile communication and data transfer. As used in this disclosure, a "third-party system" is an external computing system managed by an entity other than the primary system. In an embodiment, the third-party system may interact with the primary system through application programming interfaces (APIs), network connections, or data exchanges to provide additional functionality, resources, or services. For example, without limitation, the third-party system may include cloud computing services, payment gateways, authentication providers, healthcare data platforms, or external analytics tools that integrate with or support the operation of the primary system.

With continued reference to FIG. 1, as used in this disclosure, an "API" or "Application Programming Interface" is a set of defined protocols and data formats that enable communication between systems. In an embodiment, the API may allow applications to send requests, retrieve data, or interact with external functionalities. In a non-limiting example, the API may include a REST API, which enables web applications to communicate using HTTP methods such as GET and POST, a GraphQL API, which allows clients to request specific data structures, and the like. In an embodiment, the at least a processor 102 may be configured to transmit, using at least a network, the digital image data and the corresponding extracted cardiac metrics to a third-party system, which may facilitate communication between different software components or external systems. In a non-limiting example, the network may be a secure hospital LAN transmitting data between medical devices and cloud storage, and the API may be a healthcare data integration API that allows authorized applications to process and analyze the cardiac metrics.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
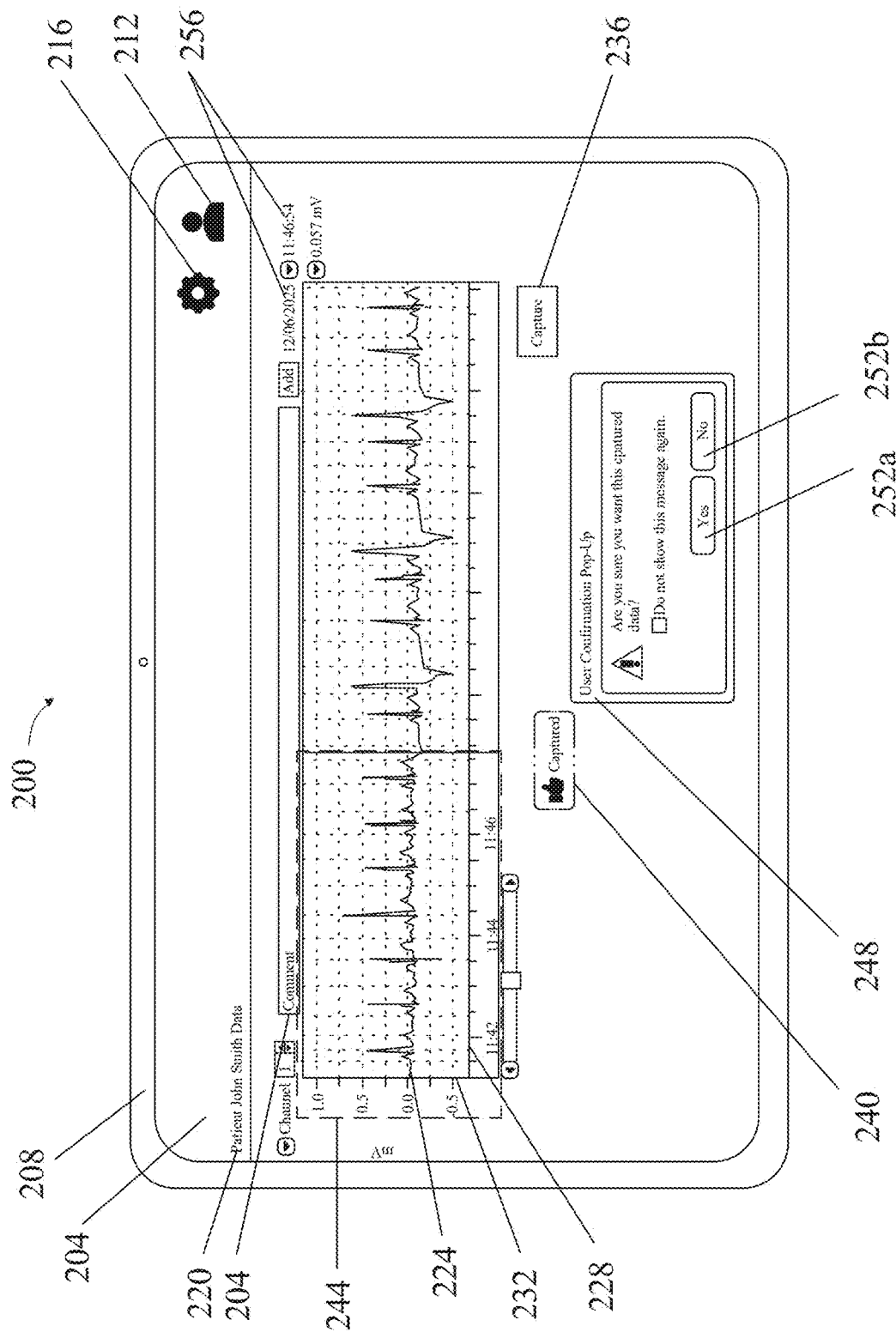
FIG. 2 is an exemplary illustration of a graphical user interface.

Referring now to FIG. 2, an exemplary illustration 200 of a graphical user interface. In an embodiment, the graphical user interface (GUI) 204 may be displayed on a downstream device 208. In an embodiment, the downstream device 208 may include a smartphone, tablet, or computer. In an embodiment, the GUI 204 may include a user profile icon 212. In an embodiment, the user profile icon 212 may serve as an interactive element that allows users to access and manage their personal account settings. In an embodiment, the user profile icon 212 may provide a direct link to the user's profile, where they may update personal information, review activity history, and configure preferences related to their interactions within the system. In an embodiment, the user profile icon 212 may enable users to modify details such as their name, contact information, medical history, or security settings. In an embodiment, the user profile icon 212 may serve as a gateway to account-related features, including login credentials, privacy controls, and system permissions. In an embodiment, the user profile icon 212 may support multi-user functionality, allowing different users to switch profiles or customize their experience within the same system. In an embodiment, the user profile icon 212 may incorporate a visual indicator, such as a profile picture placeholder, initials, or a silhouette, providing a recognizable representation of the user. In an embodiment, the user profile icon 212 may include a notification badge, alerting users to profile-related updates, messages, or required actions. In an embodiment, the user profile icon 212 may facilitate seamless user management and personalization within the GUI 204. In an embodiment, the GUI 204 may include a gear icon 216. The GUI 204 may incorporate a gear icon 216, which may provide access to system settings, allowing users to customize preferences, adjust configurations, or manage administrative controls. In an embodiment, the GUI 204 may include a header 220. The header 220 may include a patient designation. As used in this disclosure, a "header" is a section at the top of the interface. In an embodiment, the header 220 may display the patient designation, such as "John Smith", ensuring identification of the ECG data. In an embodiment, the GUI 204 may include medical time-series data 224. Without limitation, the medical time-series data 224 may include a continuous graphical representation of physiological measurements over time, such as ECG waveforms or other biometric signals. The medical time-series data 224 may be updated in real time and displayed within a defined section of the GUI for clinical assessment. In an embodiment, the medical time-series data 224 may include an x-axis 228. As used in this disclosure, an "x-axis" is a horizontal scale within a graph. In an embodiment, the graph may include the medical time-series data 224 that represents time intervals for recorded physiological signals. The x-axis 228 may include timestamps at specific intervals, such as seconds or minutes, to help visualize changes in cardiac activity over time. In an embodiment, the medical time-series data 224 may include a y-axis 232. As used in this disclosure, a "y-axis" is a vertical scale within a graph. In an embodiment, the graph may include the medical time-series data that represents the amplitude or intensity of the recorded physiological signals. In an ECG display, the y-axis may indicate voltage levels measured in millivolts (mV), allowing clinicians to assess heart rhythm variations. In an embodiment, the GUI 204 may include a capture button 236. As used in this disclosure, a "capture button" is an interactive GUI element that allows a user to initiate a screen capture event. In an embodiment, the screen capture event may be the same as the capture event described herein. In an embodiment, the screen capture data may include a portion of the displayed medical time-series data 224. The capture button may be labeled "Capture" and, when selected, may trigger the system to store an image of the current medical time-series data.

In an embodiment, the GUI 204 may include a window 244. In an embodiment, the window 244 may contain the medical time-series data 224 or other relevant information. The window 244 may present ECG waveforms, patient vitals, or real-time procedural data in an organized format. In an embodiment, the window 244 may provide users with the ability to capture a selected portion of the device screen for documentation, analysis, sharing purposes, and the like. In some embodiments, the GUI 204 may allow users to select window 244 by receiving window 244 through a click-and-drag interface (e.g., user may click first to set a first corner of window 244 and move an input device, such as a mouse or cursor, to a second location to set a second corner of window 244. In some embodiments, the GUI 204 may allow users to select window 244 through cursor input (for example, user may click a first time to set a first corner of window 244 and click a second time to set a second corner of window 244. Users may be able to activate the screenshot feature through a designated button, keyboard shortcut, menu selection within the interface, and the like. Continuing, upon activation, a crosshair or selection tool may appear, allowing users to click and drag to define the specific area of the window 244 they wish to capture. Once the selection is made, the system may generate an image file containing the captured portion of the screen, which may then be saved, copied to the clipboard, or shared as needed. The captured screenshot may include the medical time-series data 224, ECG waveforms, patient vitals, or other relevant real-time procedural data presented within the window 244. Additionally and/or alternatively, users may be provided with options to annotate, highlight, or mark specific portions of the screenshot before finalizing the capture, enhancing its utility for review and communication purposes.

With continued reference to FIG. 2, in an embodiment, the GUI 204 may include a virtual confirmation 240. Without limitation, the virtual confirmation 240 may include a notification message, animation, or sound cue confirming that an ECG capture has been successfully saved. For example, without limitation, the virtual confirmation 240 may include a pop up that says "Captured!" with a thumbs up icon. In an embodiment, the GUI 204 may include a user confirmation pop up 248. As used in this disclosure, a "user confirmation pop-up" is a dialog box or overlay displayed within the GUI that prompts the user to confirm or cancel an action before proceeding. The user confirmation pop up 248 may include a message such as "Are you sure you want to capture this ECG data?" and present selection options. In an embodiment, the user confirmation pop up 248 may include input data 252*a-b*. The input data 252*a-b* may include user-selected responses within a confirmation pop-up that determines whether an action is executed or canceled. The input data may include a "Yes" button to proceed with the screen capture and a "No" button to cancel or modify the operation. In an embodiment, the GUI 204 may include date and time settings 256. As used in this disclosure, "date and time settings" are a system feature that records and displays the time and date within the GUI 204. The date and time settings 256 may provide precise logging of ECG capture events, such as "12/06/2025 at 11:46:54", ensuring accurate documentation.

Figure 3:
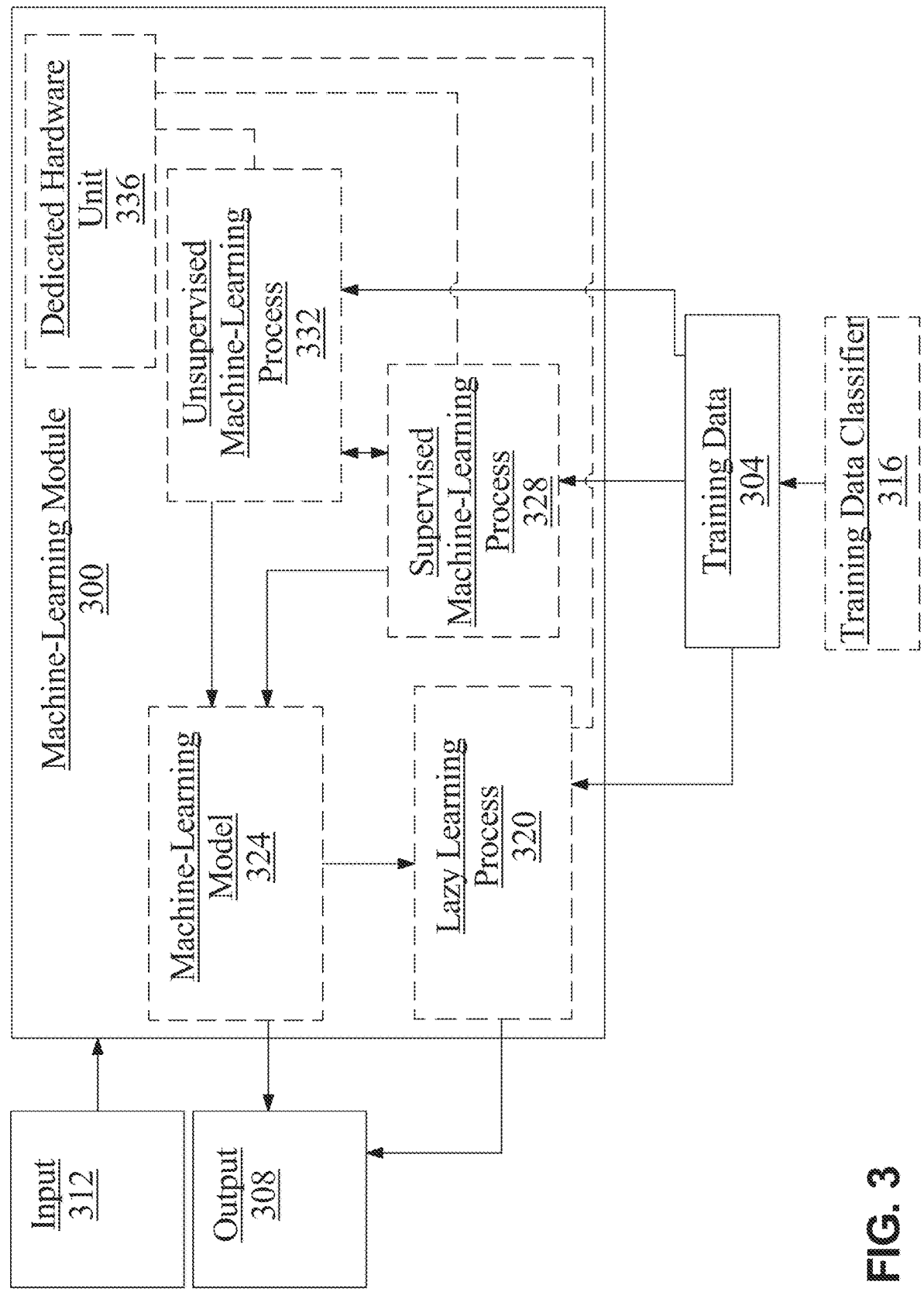
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs include digital image data and target data and the output may include the comparison and the at least a cardiac metric.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to a specific subset of cardiac conditions, such as a cohort of patients exhibiting similar ECG waveform patterns and/or other analyzed physiological characteristics, including arrhythmia types, heart rate variability trends, or ischemic event markers, for which a subset of training data may be selected. The machine learning model may receive digital image data representing real-time ECG waveforms and corresponding target data, such as historical labeled ECG images, and output a comparison between the captured digital image data and the target dataset, along with at least a cardiac metric such as QRS complex duration, ST-segment elevation, or heart rate variability analysis.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include digital image data and target data as described above as inputs, the comparison and the at least a cardiac metric as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
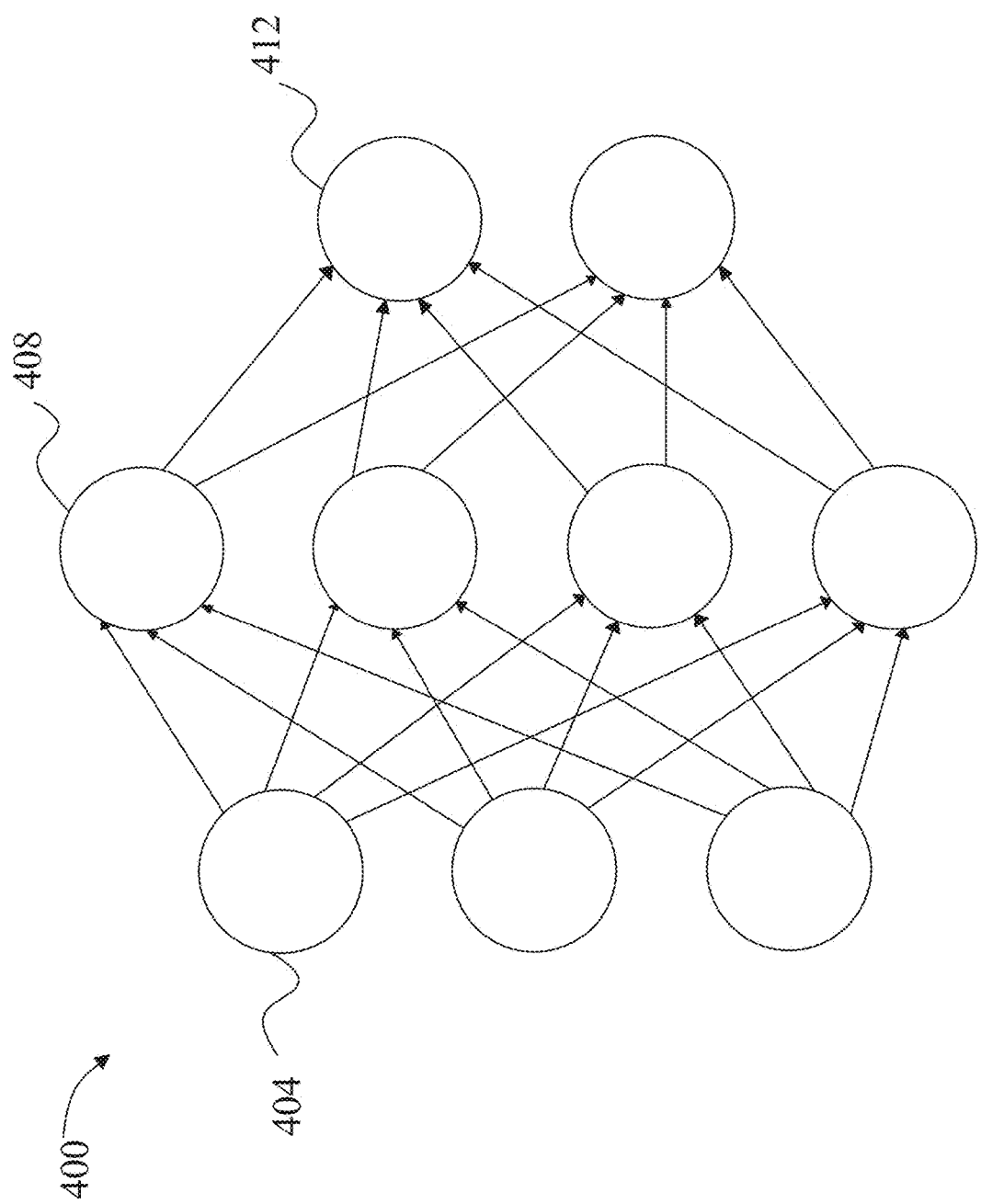
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
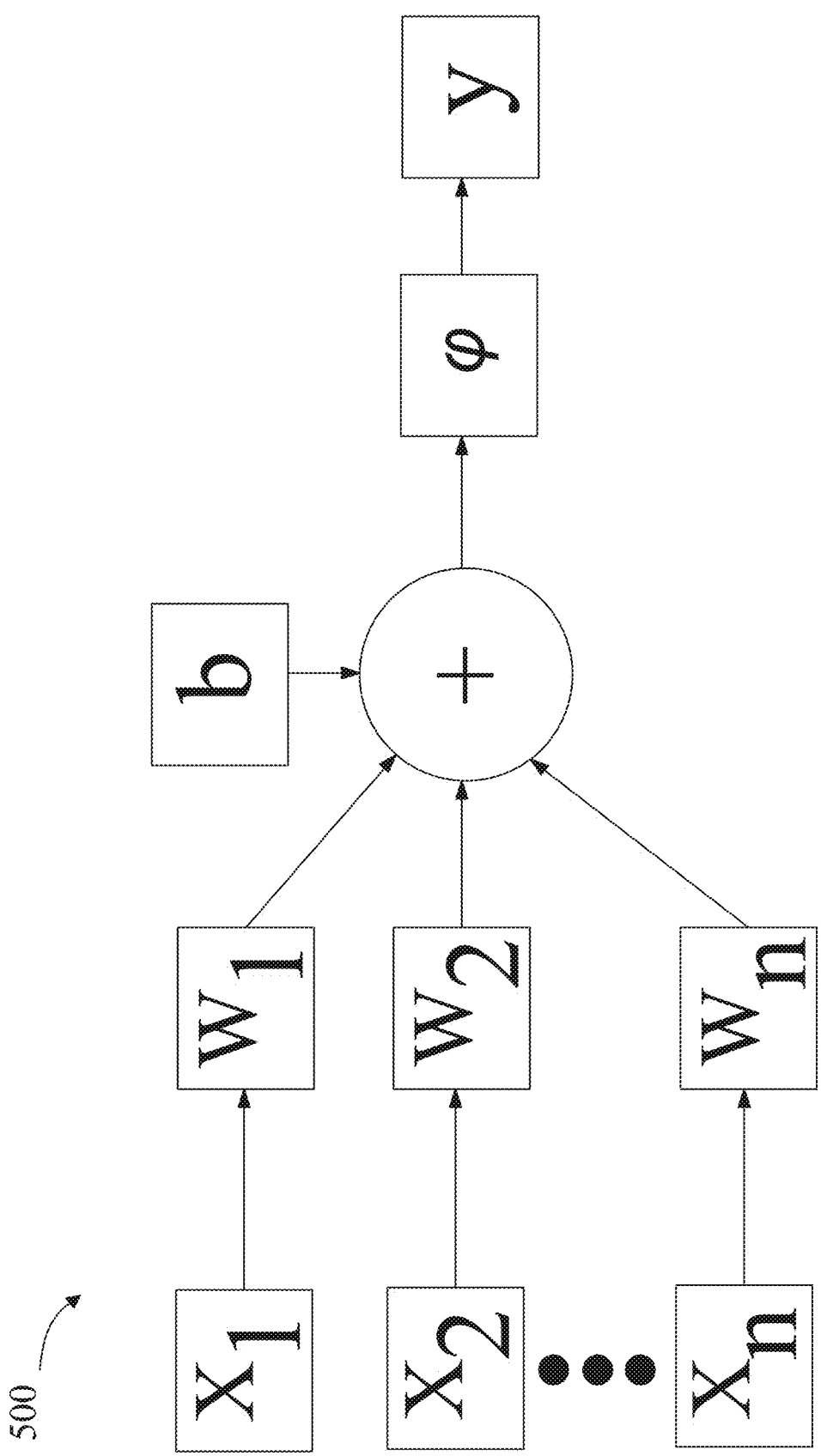
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
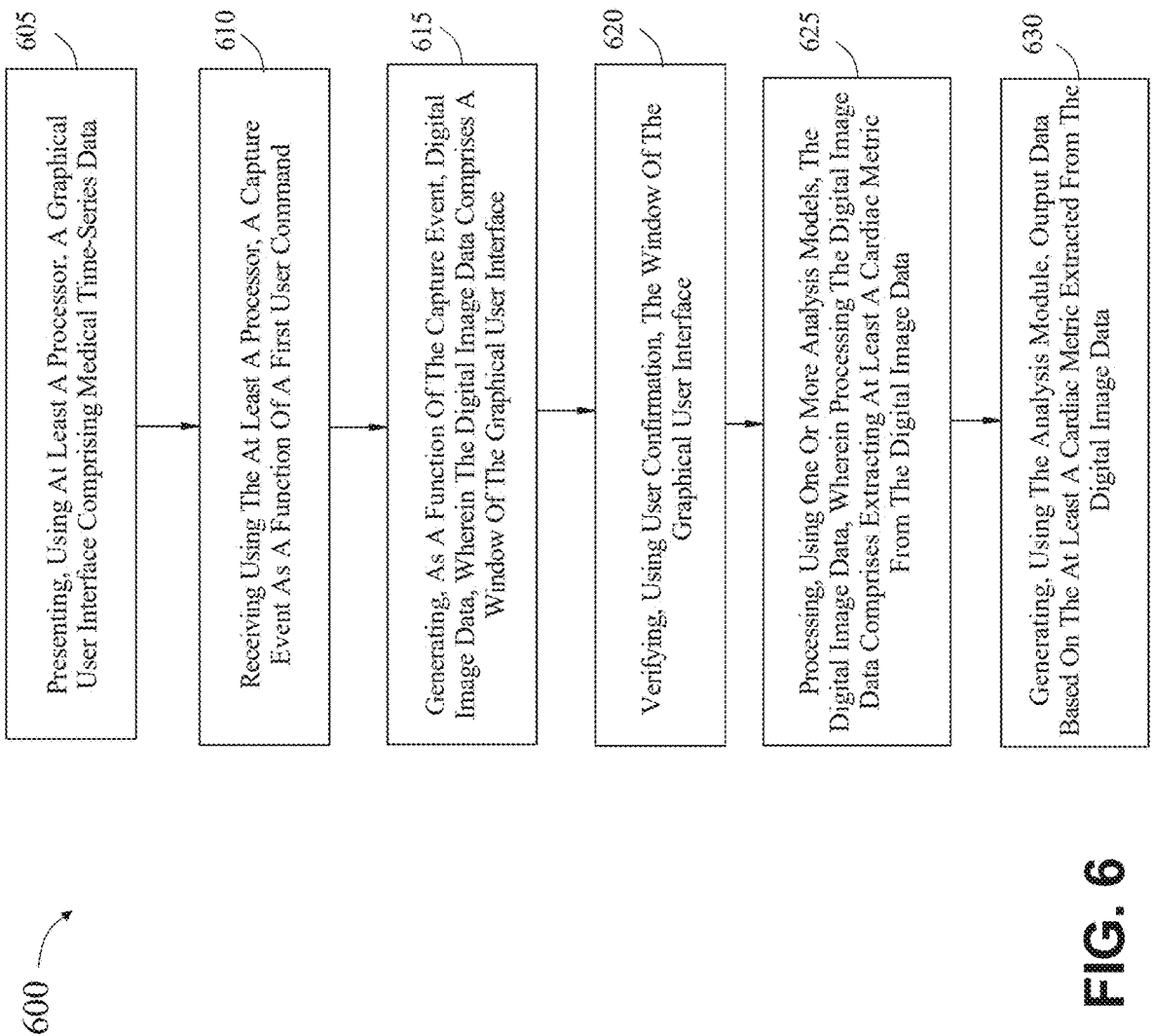
FIG. 6 is a block diagram of an exemplary method for generating output data as a function of digital image data and an analysis module.

Referring now to FIG. 6, a flow diagram of an exemplary method 600 for generating output data as a function of digital image data and an analysis module is illustrated. At step 605, method 600 includes presenting, using at least a processor, a graphical user interface comprising medical time-series data. This may be implemented as described and with reference to FIGS. 1-5.

Still referring to FIG. 6, at step 610, method 600 includes receiving using the at least a processor, a capture event as a function of a first user command. In an embodiment, the first user command may include an input from a peripheral device. In an embodiment, the capture event comprises detecting, using the at least a processor and an event handler, the first user command, accessing, using the at least a processor, a framebuffer by retrieving pixel data displayed on the graphical user interface, triggering, using user settings, a file save operation, and displaying, using the at least a processor, at least a virtual confirmation associated with the capture event. This may be implemented as described and with reference to FIGS. 1-5.

Still referring to FIG. 6, at step 615, method 600 includes generating, as a function of the capture event, digital image data, wherein the digital image data comprises a window of the graphical user interface. In an embodiment, the at least a processor is further configured to store the digital image data, corresponding extracted cardiac metrics, and the classification in a structured database. This may be implemented as described and with reference to FIGS. 1-5.

Still referring to FIG. 6, at step 620, method 600 includes verifying, using user confirmation, the window of the graphical user interface. This may be implemented as described and with reference to FIGS. 1-5.

Still referring to FIG. 6, at step 625, method 600 includes processing, using one or more analysis models, the digital image data, wherein processing the digital image data comprises extracting at least a cardiac metric from the digital image data. In an embodiment, processing the digital image data using the one or more analysis models may further include comparing, using the one or more analysis models, the digital image data to target data, identifying, using the one or more analysis models, the at least a cardiac metric as a function of a comparison of the digital image data to the target data, and extracting, using the one or more analysis models, the at least a cardiac metric using the comparison of the digital image data to the target data. In an embodiment, the one or more analysis models comprise at least a machine learning model, wherein the at least a machine learning model is configured to apply an electrocardiogram algorithm to the digital image data. This may be implemented as described and with reference to FIGS. 1-5.

Still referring to FIG. 6, at step 630, method 600 includes generating, using the analysis module, output data based on the at least a cardiac metric extracted from the digital image data. In an embodiment, the at least a processor may be configured to display, using one or more visual elements, the output data in the graphical user interface, wherein the output data comprises the comparison between the digital image data with the target data. In an embodiment, the output data comprises a classification based on extracted cardiac metrics from the digital image data, wherein the classification is assessed by classifying the digital image data using one or more cardiac metric labels and generating classification scores associated with the classification by comparing the one or more cardiac metric labels to historical labeled digital image data. In an embodiment, the at least a processor is further configured to receive real-time digital image data from a continuous capture stream and dynamically update the output data as additional cardiac metrics are extracted. In an embodiment, the output data further comprises an alert signal generated based on a deviation of the at least a cardiac metric from a predefined threshold, wherein the alert signal is visually or audibly presented in the graphical user interface of a remote device. This may be implemented as described and with reference to FIGS. 1-5

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
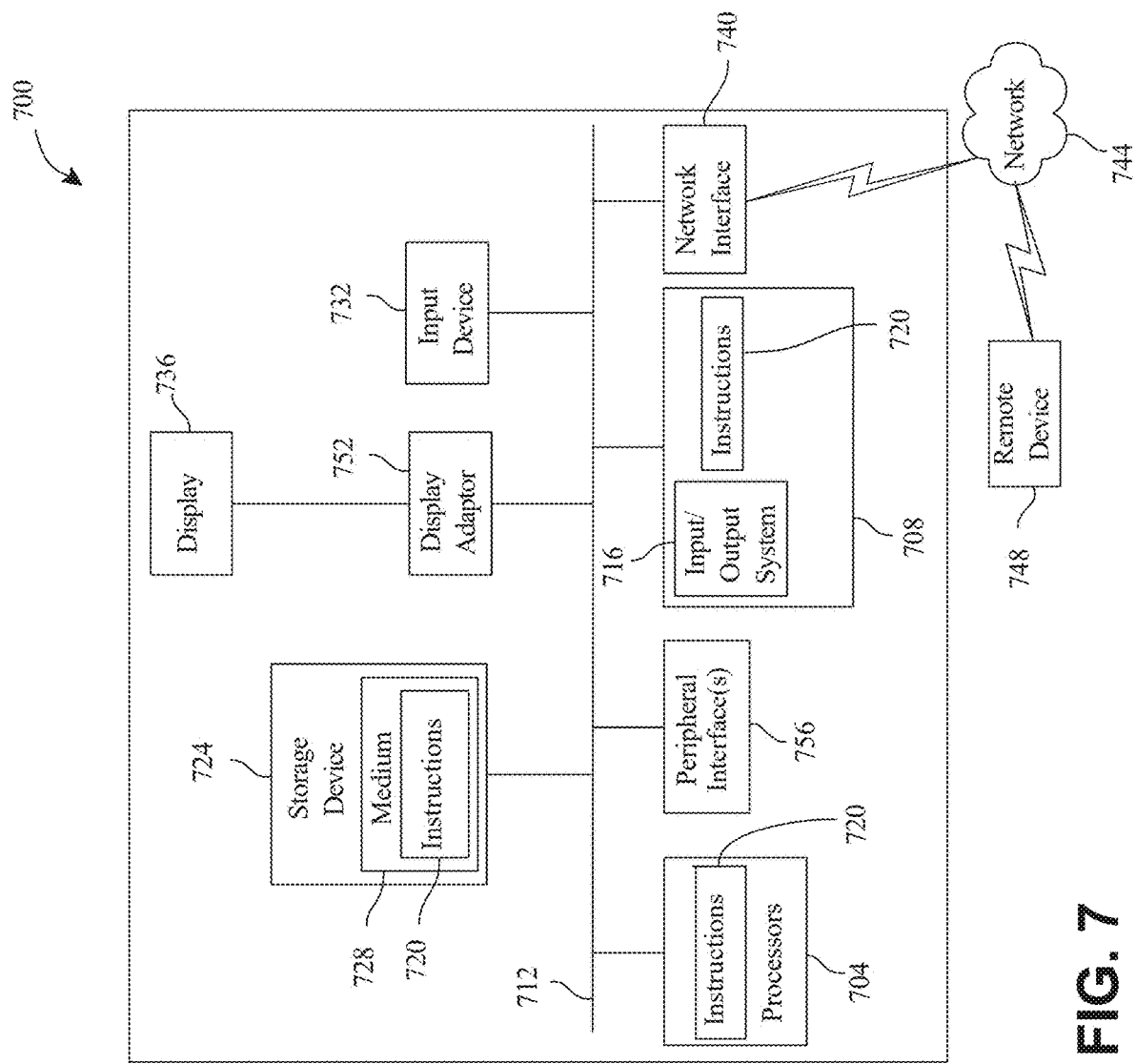
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating output data as a function of digital image data and an analysis module, wherein the apparatus comprises:
   at least a computing device, wherein the computing device comprises:
   a memory; and
   at least a processor communicatively connected to the memory, wherein the memory contains instructions configuring the at least a processor to:
   present a graphical user interface comprising medical time-series data;
   receive a capture event as a function of a first user command;
   generate, as a function of the capture event, digital image data, wherein the digital image data comprises a window of the graphical user interface;
   verify, using user confirmation, the window of the graphical user interface;
   process, using one or more analysis models, the digital image data, wherein processing the digital image data comprises extracting at least a cardiac metric from the digital image data; and
   generate, using the analysis module, output data based on the at least a cardiac metric extracted from the digital image data, wherein the output data comprises a classification based on extracted cardiac metrics from the digital image data, wherein the classification is assessed by:
   classifying the digital image data using one or more cardiac metric labels associated with diagnostic conditions; and
   generating classification scores associated with the classification, indicating a confidence level of the classification, by comparing the one or more cardiac metric labels to historical labeled digital image data comprising annotated cardiac images with verified cardiac metric classifications.

2. The apparatus of claim 1, wherein the capture event comprises:
   detect, using the at least a processor and an event handler, the first user command;
   access, using the at least a processor, a framebuffer by retrieving pixel data displayed on the graphical user interface;
   trigger, using user settings, a file save operation; and
   display, using the at least a processor, at least a virtual confirmation associated with the capture event.

3. The apparatus of claim 1, wherein the first user command comprises an input from a peripheral device.

4. The apparatus of claim 1, wherein processing the digital image data using the one or more analysis models further comprises:
   comparing, using the one or more analysis models, the digital image data to target data;
   identifying, using the one or more analysis models, the at least a cardiac metric as a function of a comparison of the digital image data to the target data; and
   extracting, using the one or more analysis models, the at least a cardiac metric using the comparison of the digital image data to the target data.

5. The apparatus of claim 4, wherein the at least a processor is configured to display, using one or more visual elements, the output data in the graphical user interface, wherein the output data comprises the comparison between the digital image data with the target data.

6. The apparatus of claim 1, wherein the one or more analysis models comprise at least a machine learning model, wherein the at least a machine learning model is configured to apply an electrocardiogram algorithm to the digital image data.

7. The apparatus of claim 1, wherein the at least a processor is further configured to receive real-time digital image data from a continuous capture stream and dynamically update the output data as additional cardiac metrics are extracted.

8. The apparatus of claim 1, wherein the output data further comprises an alert signal generated based on a deviation of the at least a cardiac metric from a predefined threshold, wherein the alert signal is visually or audibly presented through a remote device.

9. The apparatus of claim 1, wherein the at least a processor is further configured to store the digital image data, corresponding extracted cardiac metrics, and the classification in a structured database.

10. The apparatus of claim 9, wherein transmitting, using at least a network, the digital image data and the corresponding extracted cardiac metrics to a third-party system.

11. A method for generating output data as a function of digital image data and an analysis module, wherein the method comprises:
   presenting, using at least a processor, a graphical user interface comprising medical time-series data;
   receiving, using the at least a processor, a capture event as a function of a first user command;
   generating, as a function of the capture event, digital image data, wherein the digital image data comprises a window of the graphical user interface;
   verifying, using user confirmation, the window of the graphical user interface;
   processing, using one or more analysis models, the digital image data, wherein processing the digital image data comprises extracting at least a cardiac metric from the digital image data; and
   generating, using the analysis module, output data based on the at least a cardiac metric extracted from the digital image data, wherein the output data comprises a classification based on extracted cardiac metrics from the digital image data, wherein the classification is assessed by:
   classifying the digital image data using one or more cardiac metric labels associated with diagnostic conditions; and
   generating classification scores associated with the classification, indicating a confidence level of the classification, by comparing the one or more cardiac metric labels to historical labeled digital image data comprising annotated cardiac images with verified cardiac metric classifications.

12. The method of claim 11, wherein receiving the capture event comprises:
   detecting, using the at least a processor and an event handler, a first user command;
   accessing, using the at least a processor, a framebuffer by retrieving pixel data displayed on the graphical user interface;
   triggering, using user settings, a file save operation; and
   displaying, using the at least a processor, at least a virtual confirmation associated with the capture event.

13. The method of claim 11, wherein the first user command comprises an input from a peripheral device.

14. The method of claim 11, wherein processing the digital image data using the one or more analysis models further comprises:
   comparing, using the one or more analysis models, the digital image data to target data;
   identifying, using the one or more analysis models, the at least a cardiac metric as a function of a comparison of the digital image data to the target data; and
   extracting, using the one or more analysis models, the at least a cardiac metric using the comparison of the digital image data to the target data.

15. The method of claim 14, further comprising displaying the output data in the graphical user interface comprises using one or more visual elements, wherein the output data comprises the comparison between the digital image data with the target data.

16. The method of claim 11, wherein the one or more analysis models comprise at least a machine learning model, wherein the at least a machine learning model is configured to:
   apply an electrocardiogram algorithm to the digital image data.

17. The method of claim 11, further configured to receive real-time digital image data from a continuous capture stream and dynamically update the output data as additional cardiac metrics are extracted.

18. The method of claim 11, further comprising generating an alert signal of the output data based on a deviation of the at least a cardiac metric from a predefined threshold, wherein the alert signal is visually or audibly presented in the graphical user interface of a remote device.

19. The method of claim 11, further comprising storing the digital image data, corresponding extracted cardiac metrics, and the classification in a structured database.

20. The method of claim 19, further comprising transmitting, using at least a network, the digital image data and the corresponding extracted cardiac metrics to a third-party system.

21. The apparatus of claim 1, wherein the graphical user interface further comprises cardiac condition indicators, through a continuously updating time-series graph.

22. The apparatus of claim 1, wherein cardiac condition indictors comprise data related to heart rate variability, arrhythmia patterns, or ischemic event detection.

* * * * *